Aug. 7, 1945.  W. P. OSGOOD  2,381,364
PRESSING MACHINE FOR ENDS OF BOXES AND COVERS
Filed June 25, 1942  5 Sheets-Sheet 1
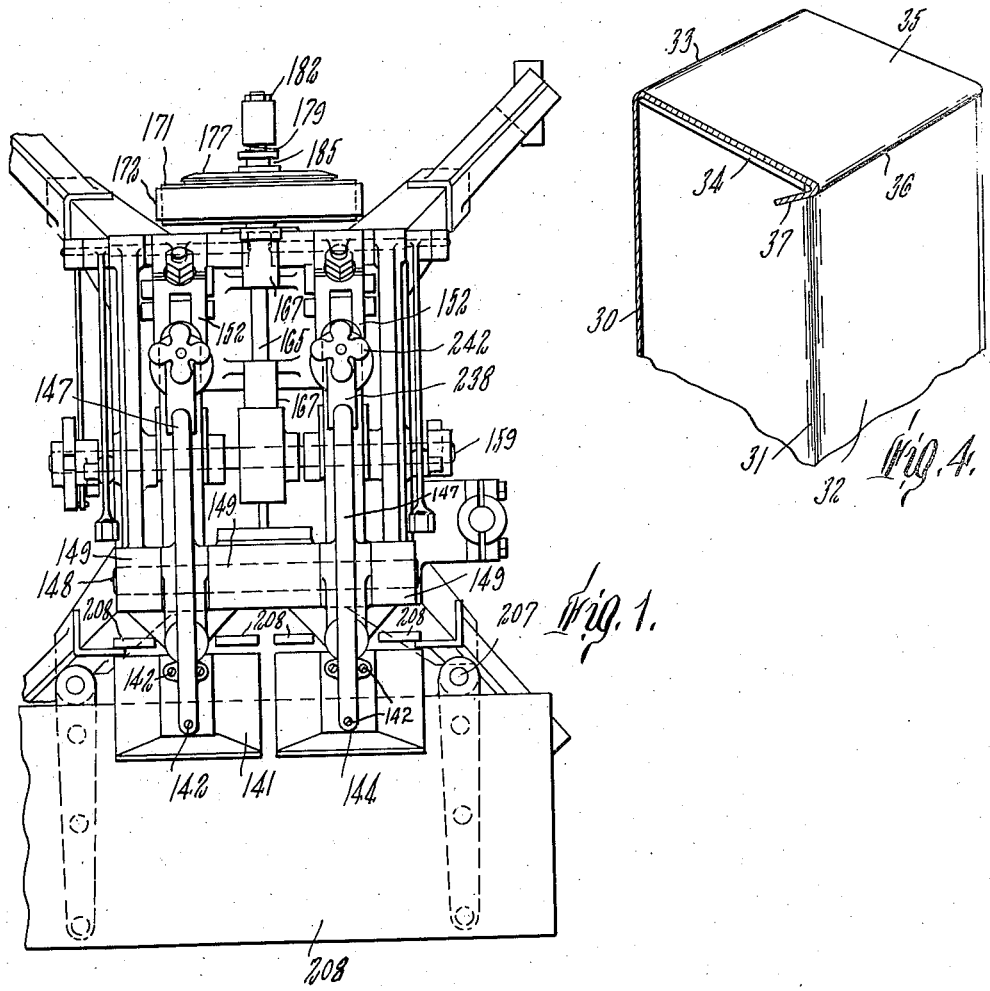
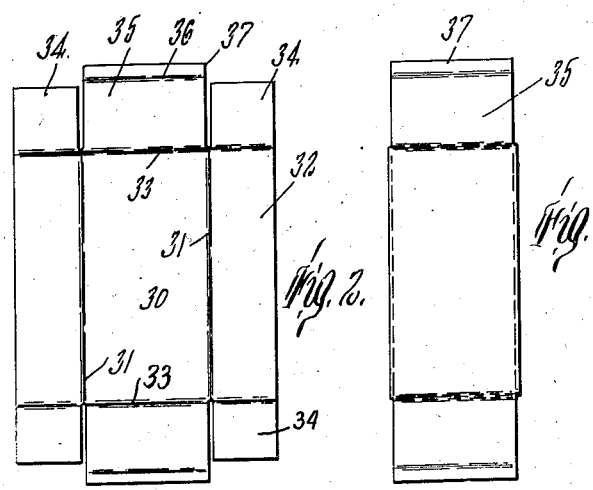
Inventor
Walter P. Osgood
by Wright, Brown, Quinby & May
Attys.

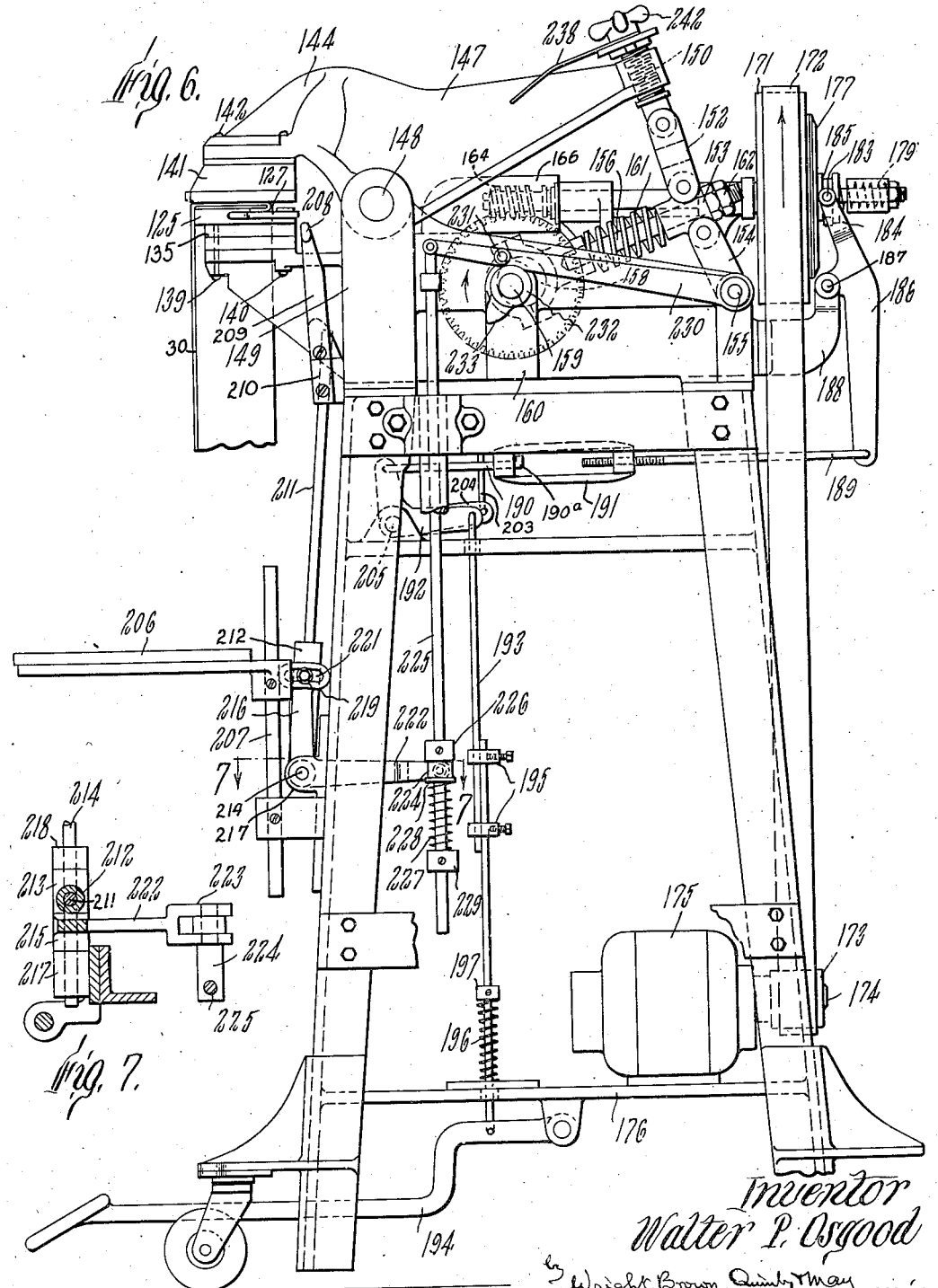

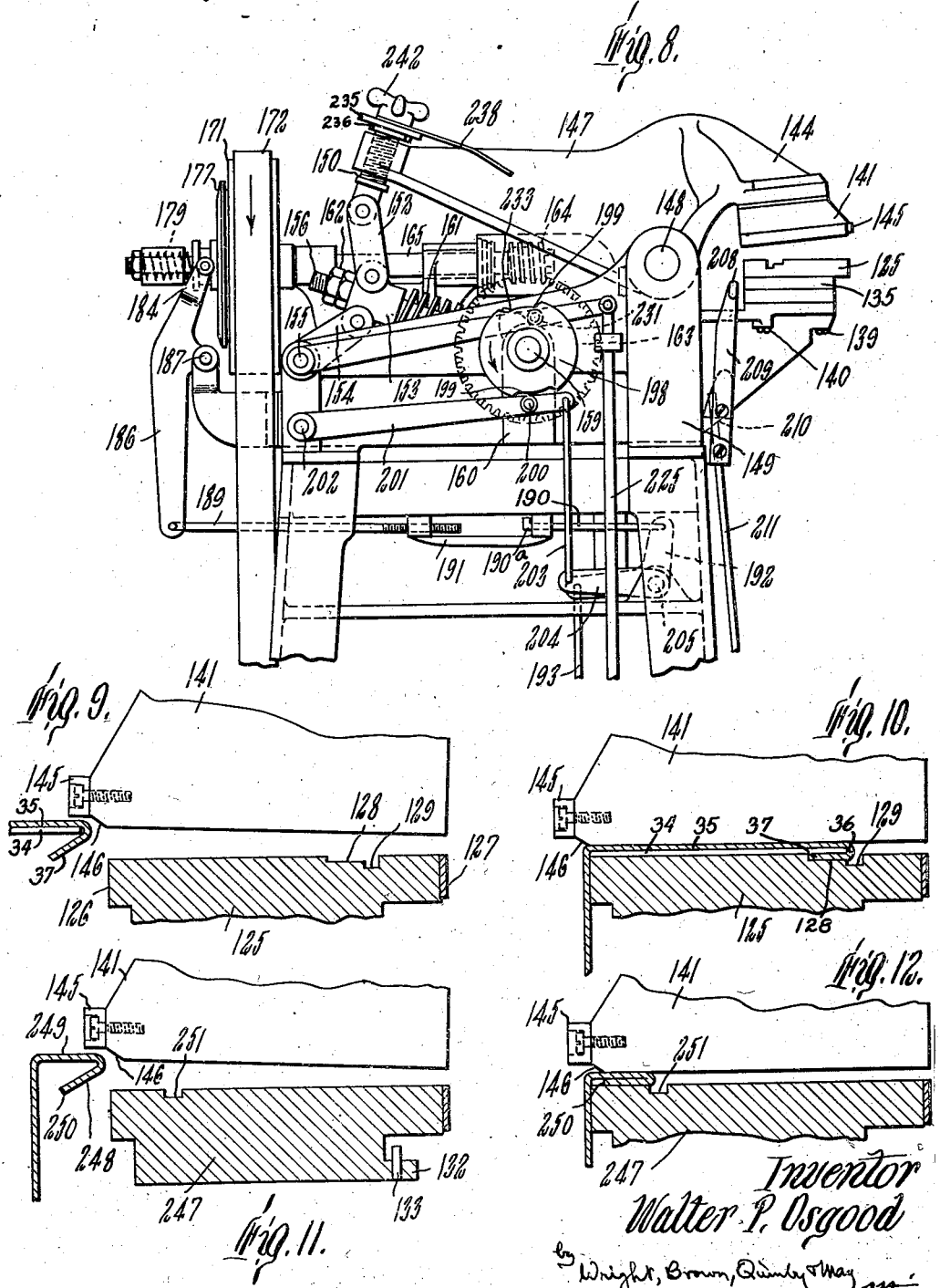

Aug. 7, 1945. W. P. OSGOOD 2,381,364
PRESSING MACHINE FOR ENDS OF BOXES AND COVERS
Filed June 25, 1942 5 Sheets-Sheet 5
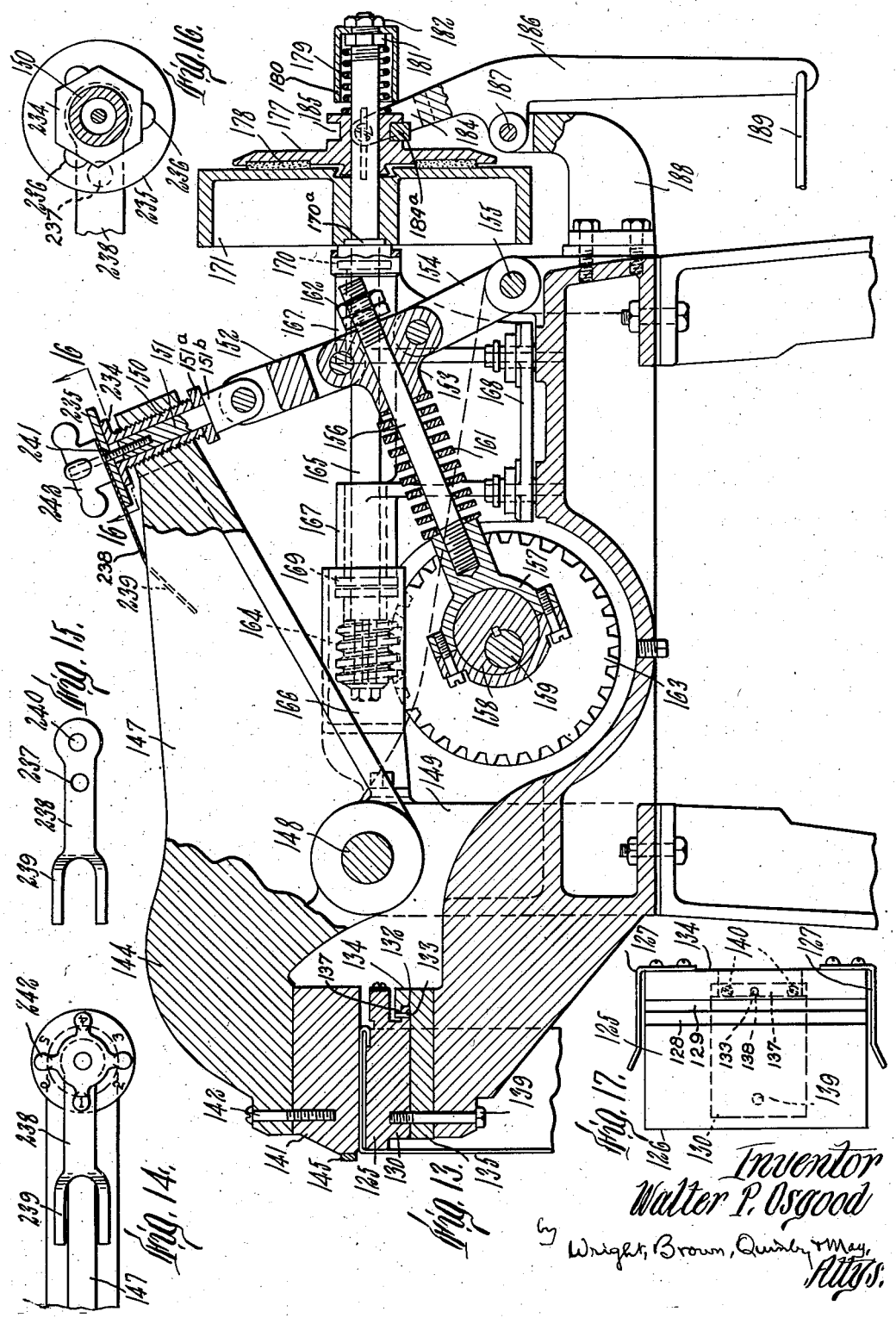
Inventor
Walter P. Osgood
by Wright, Brown, Quinby May,
Attys.

Patented Aug. 7, 1945

2,381,364

UNITED STATES PATENT OFFICE 2,381,364

PRESSING MACHINE FOR ENDS OF BOXES AND COVERS

Walter P. Osgood, Malden, Mass., assignor to Boston Machine Works Company, Lynn, Mass., a corporation of Massachusetts Application June 25, 1942, Serial No. 448,366

12 Claims. (Cl. 93—36.3)

The invention relates to a machine for pressing together the portions of a box or cover blank which form the ends of the box or cover, the pressing operation being for the purpose of causing such portions to adhere by means of cement applied to suitable surface areas of such portions immediately prior to the pressing operation.

It is an object of the invention to provide a pair of similar pressing mechanisms driven in opposite phase by a common driving means, so that when one of the mechanisms is ready to receive a blank to be pressed, the other mechanism dwells in an effective pressing position.

For a more complete understanding of the invention, reference may be had to the following description of an embodiment thereof, and to the drawings, of which Figure 1 is a plan view of a machine embodying the invention.

Figure 2 is a plan view of a box blank ready to fold.

Figure 3 is a plan view of a partly folded box blank.

Figure 4 is a fragmentary perspective view, partly in section, of a box blank ready to be pressed.

Figure 6 is a side elevation of the same.

Figure 7 is a detail section on the line 7—7 of Figure 6.

Figure 8 is a fragmentary side elevation of the machine on the side opposite to that shown in Figure 6.

Figures 9 and 10 show a pair of pressing jaws for a box end, in different positions of operation, the lower jaw being shown in section.

Figures 11 and 12 show a pair of pressing jaws for a box cover, in different positions of operation, the lower jaw being shown in section.

Figure 13 is a side elevation of the upper part of the machine, several portions being shown in section.

Figure 14 is a fragmentary plan view of one of the rocking levers.

Figure 15 is a plan view of one of the elements shown in Figure 14.

Figure 16 is a section on the line 16—16 of Figure 13.

Figure 17 is a plan view of the anvil of one of the presser mechanisms.

Figure 5:
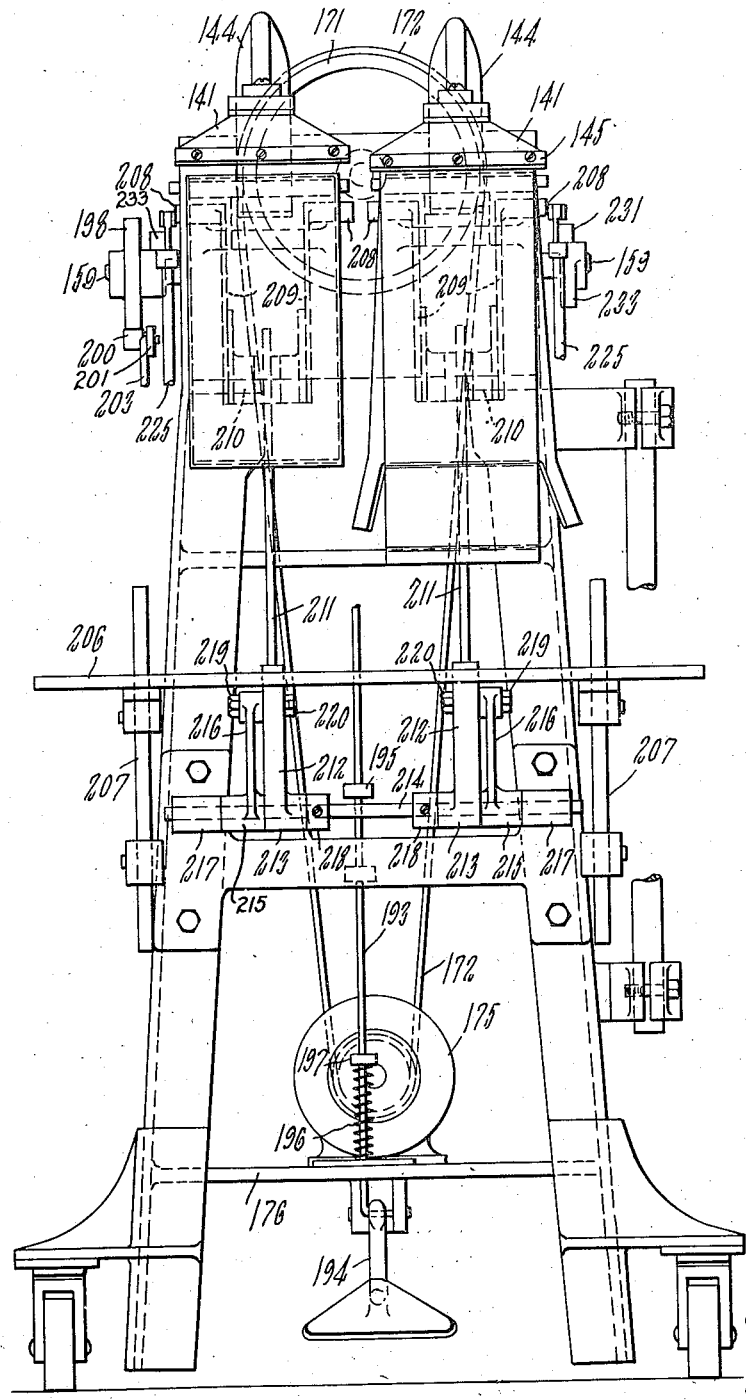
Figure 5 is a front elevation of the machine shown in Figure 1.

The pressing apparatus herein shown and described is intended and adapted for use with a mechanism for applying a coating of adhesive cement to certain areas of box blanks such as the one shown in Figure 2. This blank comprises a bottom portion 30 bounded by longitudinal creases or scores 31, beyond which are side portions 32, and transverse creases 33 which define corner flaps 34 and end walls 35. Each end wall is creased or scored at 36 so that the extreme end portion 37 thereof can readily be bent back as indicated in Figure 4 to enfold and stiffen the upper margins of the end flaps 34 in the finished box.

In making up a box from the blank which is bottom side up as shown in Figure 2, the operative bends down the side portions 32 on the creases 31 and then bends the corner flaps 34 at one end inward on the creases 33 to the position shown in Figure 3. This leaves the end wall 35 projecting out to receive adhesive. Suitable cement is applied to the under face of the flap 35, whereupon this flap is bent down against the outer faces of the adjacent corner flaps 34. The extremity 37 of the end flap is then bent on the crease 36 to enfold the margins of the flaps 34 as shown in Figure 4. This end of the partly formed box is now ready to be pressed so as to hold the end flap 35 tightly against the outer faces of the corner flaps 34 and to hold the extremity 37 against the inner margins of the flaps 34 while the adhesive takes its initial set. When this operation is completed, the other end of the box is similarly treated. In much the same way, box covers are made from suitable blanks.

For the pressing operations, two pressing devices, driven in opposite phase by common driving means, are provided. Each pressing device comprises a pair of jaws which open to receive and permit discharge of the work and which close to press the work. As the two pressing devices are substantially identical, a description of one will suffice for both.

The lower jaw of each device includes a rectangular anvil 125 adapted to receive and fit within a box end. The anvil is mounted with its upper face horizontal, the front face 126 and the side faces being vertical. The width of the anvil is substantially equal to the inner width of the box, so that the sides of the box should be held against or close to the side faces of the anvil during the pressing operation. For this purpose a pair of spring clips 127 are mounted on the rear face of each anvil (Figures 6 and 17), these clips extending forward along the side faces to confine the sides of the box which is placed on the anvil. The top face of the anvil 125 is provided with a transverse channel 128 to receive the free end of the portion 35 of the box, together with the bent-over portion 37 thereof. Adjoining the channel 128 is a narrower and deeper channel 129 which prevents crushing of the crease at the score 36. The channel 129 serves this purpose by providing a space into which the fold between the wall 35 and the lip 37 may be deflected. It is located at a distance from the forward edge of the anvil which is so related to the height of the box wall that the said fold overhangs the channel. Thus it is not pinched and crushed when the presser (later described) comes down on the anvil. The rear portion of the anvil is undercut (Figure 13) and has a rearwardly projecting flange 132 from the center of which a fixed pin 133 projects up. The anvil 125 has a reduced lower portion 130 (Figures 13 and 17) resting on a base block 135 which in turn rests on and is secured to the main frame of the machine. Along the rear edge of the base block 135 is an upstanding ridge 134 having a forwardly projecting flange 137 under which the flange 132 fits when the anvil 125 is in position. The flange 137 has a central notch 138 which receives the pin 133 when the anvil is correctly placed on the base. Said flange and pin assist in centering the anvil when applied to the base, and they cooperate with a bolt 139 in securing the anvil immovably. Bolt 139 passes upward through a portion of the main frame and through a hole in the base block 135 into threaded connection with the anvil. Thus it secures the front end of the base block, the rear end of which is secured by two bolts 140 (Figures 6, 8 and 17) which extend upward through the part of the frame and are threaded into the base block but do not enter the anvil. Thus the anvil can be easily removed after unscrewing the single bolt 139, and another anvil substituted for it. Different anvils are required for operation on boxes and covers of different widths and depths, and the pin 132 and bolt 139 constitute means for quickly locating and securing anvils in correct register, and quickly removing them preparatory to making substitutions. The base block 135, however, is permanently secured by the rear bolts 140.

Cooperating with the anvil 125 to press the work is a pressing jaw 141 which is secured by screws 142 to a head 144. The bottom face of the jaw 141 is plane and is of sufficient area to engage the entire outer face of the end of a box of the largest dimensions capable of being operated on by the machine. The front of the jaw 141 projects forward a little beyond the front of the anvil (Figures 9, 10 and 13), a strip 145 being added to augment the forward projection and to act as an abutment or guide for a box end as it is brought up from the cementing mechanism to be put on the anvil. The forward edge of the jaw is also beveled as at 146 to guide the edge of the work into the space between the pressing elements.

The head 144 is the short, forward arm of a rocking beam 147 which is pivoted on a horizontal shaft 148 journaled in three brackets 149 (Figure 1) on the main frame. The longer, rearward arm of the beam 147 is provided with a connection fitting including a threaded sleeve 150 extending therethrough, a stem 151 contained in and protruding from the lower end of the sleeve, and a washer 151a between the sleeve and a shoulder 151b on the stem. A double link 152 is pivotally connected at one end to stem 151 and at its other end to a second link 153 which in turn is pivoted to another double link 154. The latter is pivoted also to a fixed bracket on the main frame as at 155. The link 153, which, as is evident from Figure 13, is the central element of a double toggle, has a transverse bore in which is fitted a rod 156. An end portion of the rod 156 is tapped into an eccentric strap 157 which is on an eccentric 158 keyed to a shaft 159. The shaft 159 is journaled in fixed brackets 160 on the main frame. On the rod 156 between the strap 157 and the link 153 is a compression spring 161 which presses the link rearwardly against a pair of mutually locked nuts 162 on the threaded rear end of the rod 156. Each of the two pressing mechanisms has an eccentric 158, these eccentrics being angularly spaced by 180° on the shaft 159.

The shaft 159 carries a worm wheel 163 which is driven by a worm 164 on a horizontal shaft 165 and is enclosed by a housing 166 secured to the central bracket 149 (Figure 13). The shaft 165 rotates in bearings 167 which are supported above a platform 168 secured to the frame. The shaft 165 is provided with a thrust bearing 169 interposed between the worm 164 and the front end of the adjacent bearing 167 to take the reactive thrust of the worm wheel 163. The shaft 165 is provided with another thrust bearing 170 interposed between the rear end of the rear bearing 167 and a flange 170a integral with the shaft. A pulley 171 is mounted loosely on the shaft 165 adjacent to thrust bearing 170 and has a recess in which flange 170a is contained with a slight clearance. The pulley 171 is continuously driven by a belt 172 which passes over a driving pulley 173 on the armature shaft 174 of an electric motor 175 supported on a platform 176.

The shaft 165 may be connected to the constantly rotating pulley wheel 171 by means of a clutch comprising a disk 177 splined on the shaft and having a friction ring 178 presented to the rear face of the pulley wheel 171. A compression spring 179 on the shaft 165 between the hub of the disk 177 and a pair of nuts 181 and 182 on the rear end portion of the shaft tends to press the disk against the pulley, and the pulley against thrust bearing 170. A cup-shaped housing 180 may be provided and secured to the shaft between nuts 181 and 182, as shown, to inclose spring 179. The engagement of the disk 177 with the pulley wheel is controlled by means comprising a yoke 184 having a pair of pivot studs 183 projecting into sockets in a half ring 184a which rides in a circumferential groove 185 in the hub of the disk. The yoke is at the upper end of a rocking lever 186 which is pivoted at 187 to a bracket 188 and is connnected with a tension member or rod 189 (Figure 6). This member is adjustably connected to another tension member or rod 190 through a turnbuckle 191 and the member 190 is connected through a bell-crank 192 to a vertical rod 193 which extends down to an operating treadle 194. Said turnbuckle has a threaded connection with rod 189 and a freely rotatable and slidable engagement with rod 190, the latter having a head 190a arranged to prevent withdrawal from the turnbuckle. The rod 193 is in two sections held together by clamps 195 so that the length of the rod can be adjusted. The rod is pushed upwardly by a relatively heavy compression spring 196, one end of which rests on the platform 176 and the other end presses against a collar 197 on the rod. The spring 196, when not prevented by means later described, acts through the bell-crank 192, the tension members 191 and 189, and the lever 186 to withdraw the disk 177 away from the pulley wheel 171 against the pressure of the spring 179. The spring 196 is strong enough, with aid from the mechanical advantage of the levers 192 and 186, to overcome the spring 179. Thus the clutch is normally disconnected.

When the end of a box or cover is placed on one of the anvils, the operative steps on the treadle 194, pulling the rod 193 down against the pressure of the spring 196. This permits the spring 179 to press the disk 177 against the pulley wheel 171 so as to engage the clutch and cause the mechanism to be driven by the pulley. Thus the shaft 165 and worm 164 are rotated, driving the gear 163 and the shaft 159. This results in the opening of the closed pressing jaw and closing of the open pressing jaw as the shaft 159 makes half a revolution. It is desirable that the shaft 159 stop at that point unless the operative can supply box ends to be pressed rapidly enough to keep the mechanism in continuous operation. To this end a cam device is provided to keep the clutch engaged after the treadle has been momentarily depressed, until the shaft 159 has turned through an angle of 180°. As shown in Figure 8, a cam 198 is mounted on the shaft 159 so as to turn with it. The cam 198 is provided with two diametrically opposed depressions 199 between dwells of equal height. A cam follower 200 is arranged to bear against the edge of the cam 198 and ride into and out of the depressions 199. The follower 200 is shown as a roller mounted on an arm 201 which is pivoted at 202 to the frame. The free end of the arm 201 is connected by a rod 203 to an arm 204 which is mounted on a shaft 205. The bell crank 192 is also mounted on this shaft.

As is evident from Figures 6 and 8, when the operation of the mechanism is started by depressing the treadle 194, the cam 198 starts to turn and the depression 199 moves beyond the cam follower 200. Thus the spring 196 is prevented from uncoupling the driving shaft 177 until the follower 200 enters the next depression 199 after half a revolution of the shaft 159, wherefore, after each depression of the treadle, the mechanism operates to close the open jaws and to open the closed jaws, and then stops.

As soon as either pressing jaw frees the work on its corresponding supporting anvil, an unloading device or ejector is thrown into operation which ejects the pressed box end from that anvil so that it falls onto a table 206 which is mounted by means of brackets on a pair of vertical rods 207 adjustably secured to the main frame. The unloading device for each anvil comprises two outwardly extending ears 208 located at the rear, and one at each side, of the supporting anvil. As indicated in Figures 5, 6 and 8, the ears 208 are parts of angle members 209 which are mounted by means of crossheads 210 to vertical rods 211. Each rod 211 is secured to, or is an extension of, an arm 212 having a hub 213 loosely mounted on a horizontal shaft 214 which is supported at its ends in bearing brackets 217 secured to the frame. Adjacent to each hub 213 is the loosely mounted hub 215 of an arm 216. The hubs are restrained from axial movement on the shaft 214 by the bearing brackets 217 and collars 218 on the shaft (Figure 5).

Each arm 216 is coupled to the adjacent arm 212 by an adjustable connection comprising a bolt 219 mounted in arm 212 and passing through an arcuate slot 221 in arm 216, and a clamping nut 220 on the outer end of the bolt.

Each arm 216 is part of a bell-crank having a horizontal arm 222 (Figure 6) terminating in a fork 223 (Figure 7). Through the arms of the fork extends the rounded reduced end portion of a rectangular bar 224. This bar has a vertical hole therein through which loosely passes a rod 225. Secured to the rod 225 immediately above the bar 224 is a collar 226. Below the bar 224 a spring 227 which is on the rod 225 presses upward through a washer 228 which bears against the lower face of the bar 224. The lower end of the spring 227 bears against a collar 229 fixed on the rod 225.

The upper end of each rod 225 is pivoted to a corresponding rock-arm 230, these arms being rockable about the shaft 155. Each arm 230 has at an intermediate point a cam follower 231 bearing on a cam 232 which is circular except for a single rise 233 of limited angular extent. The cams for the two ejectors are fixed on the shaft 159 180° apart in opposite phase, and revolve with this shaft. Each cam rise 233 is so related angularly to the corresponding eccentric 158 that during the opening movement of either pressing jaw, the corresponding cam follower 231 is lifted by its cam 233 thereby elevating its rod 225. This rocks the bell-crank 216, 222 and kicks forward the ears 208 of the ejector adjacent to the presser which is opening. The actuation of the ears is not positive but is effected through the spring 227. Hence, if any box sticks or binds on the anvil against which it has been pressed, the spring yields and limits the force which the ejector ears can exert on the edges of the box to an amount which is insufficient to injure the box. The discharging and return movements of each ejector occur during the opening movement of the corresponding pressure jaw, and are completed when the jaw is stopped in fully open position.

In order to permit adjustment of the upper pressing jaws to accommodate work made of stock of different thicknesses, the threaded sleeve 150 of each is arranged to be rotated so as to alter the effective distance between the rear end of the rocking beam 147 and its connection with the toggle linkage. The sleeve is manually rotated by a disk 235 having three or more studs arranged to embrace the rim of a hexagonal flange 234 on the sleeve, and to transmit torque thereto. The disk may carry graduations or other indicia on its upper surface to indicate the extent of the adjustments so made. A cooperating index is provided in the form of a plate or tongue 238 overlying the disk and having an opening or window 237 through which the marks on the disk are visible. One end of this tongue forms a fork 239 which straddles the beam 147, and its other end contains an opening 240 arranged to fit loosely on a screw 241 which is threaded into the upper end of the stem 151. The screw 241 is manipulated by a hand-wheel 242 secured to the upper end thereof. The hub of the hand-wheel bears against the upper face of the tongue 238, and, when set up tightly, binds the tongue frictionally to the disk 235. Since the fork 239 prevents any rotation of the tongue about the axis of the stem 151, the disk 235 is thus held against rotation. The pins 236, in turn, hold the sleeve 150 against rotation. Thus the sleeve 150 is prevented from getting out of adjustment during the operation of the machine.

As hereinbefore mentioned, the links 152 and 154 comprise, with the rear end of the link 153, a double toggle. When the eccentric 158 is rotated to the position shown in Figures 6 and 13 from a position at the opposite side of shaft 159, the links of the toggle are almost straightened to swing the head 144 downwardly and thus bring the pressing jaw into its position of pressure. One characteristic of a toggle of this description is that, if the eccentric 158 is revolved constantly, the period of maximum pressure on the work is of substantial duration instead of being momentary as it would be in the case of a simple toggle device.

Referring to Figures 9 and 10, the pressing jaw 141 and the anvil 125, which are arranged to operate upon the end of a box, are mounted so that the angle between the incline 146 and the pressing surface of the jaw 141 is in the plane of and vertically above the front face 126 of the anvil 125. When a box cover is to be operated upon as illustrated in Figures 11 and 12, the anvil jaw 247 is substituted for the anvil jaw 125, all of the other parts being the same. This anvil jaw 247 is mounted in the machine so that it juts out beyond the angle between the incline 146 and the pressing surface of the jaw 141 when the jaw 141 and anvil 247 are in operative position. The turned-in margin 248 of the box cover blank is of such a width, compared with that of the cover flange 249 that its free edge 250 comes directly under the angle between the incline 146 and the pressing surface of the jaw 141, as shown in Figure 12. The anvil is provided with a transverse channel 251 to prevent crushing of the crease between the box cover flange 249 and its turned-in margin 248.

It is evident that various modifications and changes may be made in the embodiments of the invention herein shown and described without departing from the spirit or scope thereof as defined in the following claims.

I claim:

1. A box-ending machine comprising a frame, two stationary anvils supported on said frame, each said anvil being shaped to fit into an end of a box to be pressed, two presser members rockably mounted on said frame, each said presser member having a head arranged for pressing engagement with a corresponding anvil, means for rocking said presser members in simultaneous alternation including a shaft, two similar machine elements secured to said shaft at relatively opposite sides of the axis thereof, transmission mechanism between each said machine element and one of said presser members, whereby one presser member is moved toward its cooperating anvil while the other is moved away from the other anvil, and means for driving said shaft.

2. A box-ending machine comprising a frame, two stationary anvils supported on said frame, each said anvil being shaped to fit into an end of a box to be pressed, two presser members rockably mounted on said frame, each said presser member having a head arranged for pressing engagement on a corresponding anvil, means for yieldingly rocking said presser heads alternately into cooperating pressing relation with their respective anvils, an ejecting device at each anvil, and means for yieldingly operating each ejecting device when the corresponding presser head is being separated from its anvil.

3. A box-ending machine comprising a frame, two stationary anvils supported on said frame, each said anvil being shaped to fit into one end of a box to be pressed, two presser members rockably mounted on said frame, each said presser member having a head arranged for pressing cooperation with one of said anvils, means for rocking said members in opposite phase whereby either one of said heads is in pressing cooperation with its anvil when the other head is withdrawn from its anvil, means for ejecting work from each said anvil, and means for operating the ejecting means at each anvil when the corresponding presser head is being separated therefrom.

4. A box-ending machine comprising a frame, a plurality of pressing mechanisms mounted on said frame, each said mechanism including a stationary anvil having an upper face adapted to fit within the end of a box to be pressed and a rockable member with a presser jaw movable into pressing cooperation with the corresponding anvil, common means for driving said rockable members in opposite phase so that each said member reaches its pressing position on its anvil as the other reaches its position of maximum separation from its anvil, and control means for stopping said driving means automatically when each of said rockable members has been brought into cooperative pressing relation with its respective anvil.

5. A box-ending machine comprising a frame, two stationary anvils supported on said frame, two presser members rockably mounted on said frame, each said presser member having a head arranged for pressing cooperation with a respective anvil, a shaft mounted in said frame, two eccentrics secured in opposite phase on said shaft, eccentric straps and intermediate toggle mechanisms operatively connecting said eccentrics each with one of said presser members whereby said presser heads are moved alternately into pressing engagement with their corresponding anvils, driving means for said shaft normally disconnected therefrom, a clutch for connecting the shaft operatively with said driving means, and means for automatically disconnecting said driving means when the shaft has rotated sufficiently to put one head in pressing position and the other head in withdrawn position, with relation to their respective anvils.

6. A box ending machine comprising a frame, a plurality of pressing mechanisms mounted on said frame, each said mechanism including a stationary anvil adapted to enter within the end of a box and having a face arranged to support an end wall of such box while being pressed, and a cooperating presser movable into wall-pressing relation to said anvil face and away therefrom, common driving means for all of said pressers organized to move said pressers successively into pressing relation with the corresponding anvil and withdraw a presser from its respective anvil each time a presser is moved into pressing relation a power driver for said common mechanism, disconnectible clutch means for coupling and uncoupling said driver with and from said mechanism respectively, manually operable means for putting said clutch means into coupling relation, and automatic means organized to effect uncoupling action of said clutch means when any presser arrives in pressing relation with its respective anvil.

7. A dual box ending machine comprising a plurality of anvil and presser mechanisms, the anvil and presser of each such mechanism being adapted to receive and compress between them a box wall, means for actuating said mechanisms in alternation so that the anvil and presser of each are brought into pressing relation while the anvil and presser of another are relatively separated to admit a box wall between them, common actuating means for all of said mechanisms, an independently movable driver for said last-named means, a clutch shiftable to connect said driver with said actuating means and to disconnect them, automatic clutch controlling means organized to place said clutch in disconnecting position whenever any of said pressers is in pressing relation with its respective anvil, and manual means for shifting the clutch into connecting position.

8. A box end pressing machine comprising an anvil adapted to support a box wall while being pressed, a presser head supported for cooperating engagement with said anvil, means for moving said presser head toward and away from the anvil, an ejector located adjacent to the anvil and movable from a withdrawn position in a path such that it engages and displaces a box supported by the anvil, and mechanism for so moving the ejector including a yieldable transmission member organized to limit the pressure capable of being exerted by the ejector on such a box.

9. In a machine of the character described, an anvil adapted to support an end wall of a box and to be embraced by the contiguous side walls of said box, an ejector supported with provisions for movement in a path beside said anvil where it may engage and displace a box supported by the anvil, and automatic mechanism for actuating the ejector including a linkage and a yieldable transmission member interposed between elements of said linkage and adapted to yield when the ejector is brought to bear on a box which abnormally resists displacement from the anvil.

10. In a machine of the character described, an anvil adapted to support an end wall of a box and to be embraced by the contiguous side walls of said box, an ejector supported with provisions for movement in a path beside said anvil where it may engage and displace a box supported by the anvil, and automatic mechanism for actuating the ejector including a driving member and transmission connections between said driving member and the ejector, said transmission connections having provisions for adjustment whereby the limits of movement of the ejector may be altered.

11. In apparatus for pressing a box wall or the like having an inturned marginal portion, cooperating anvil and presser members adapted to receive such wall and inturned portion between them, said anvil having a surface portion arranged to support said marginal portion of the box wall, and means for forcing said members together so as to exert pressure on the box wall and its margin; one of said members having in its supporting surface a channel below the level of the margin supporting surface arranged to be overlaid by the fold between said wall and turned-in margin, whereby to safeguard the fold against being crushed by the pressure exerted by said anvil and presser members.

12. In a machine for pressing a box wall or the like having an inwardly turned marginal flap, an anvil having a supporting surface with a portion adapted to underlie and support said marginal flap, a cooperating presser head movable toward and away from said supporting surface, and means for actuating said presser to exert substantial pressure on material placed between it and the supporting surface of the anvil; the anvil having in said supporting surface a channel below the level of said margin supporting surface portion located to be overlapped by the fold between the box wall and its inturned flap whereby to relieve said fold of pressure exerted by the presser member when the latter is forced toward the anvil.

WALTER P. OSGOOD.